3,364,221
N-CARBOXYALKYLPIPERIDYL, PIPERIDYL ALKANES
Francis E. Cislak, Indianapolis, Ind., assignor to Reilly Tar & Chemical Corporation, Indianapolis, Ind., a corporation of Indiana
No Drawing. Filed May 10, 1965, Ser. No. 454,653
4 Claims. (Cl. 260—294)

This invention relates to new compositions of matter. More particularly, it relates to new organic compounds, N-carboxyalkylpiperidyl, piperidyl alkanes, which compounds have the formula,

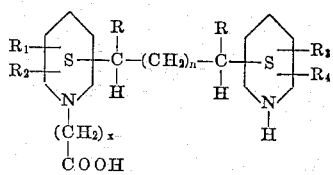

wherein R, $R_1$, $R_2$, $R_3$, and $R_4$ represent hydrogen or lower alkyl, they may be alike or they may be different; $x$ is a small integer from 1 to 4; $n$ is a small integer from 0 to 4.

In general my new compounds may be prepared by the reaction of a halogenoalkyl-carboxylic acid with an excess of a di-piperidylalkane in the presence of an alkali metal hydroxide or carbonate. Some of them may be prepared by the hydrolysis of an N-cyanoalkylpiperidyl, piperidyl alkane.

My new amino acids may also be prepared by the catalytic hydrogenation of a mono-quaternary salt of a carboxy-alkyl dipyridylalkane. The equation below portrays the conversion of carboxyethyl-1,3-di-4-pyridylpropane bromide to 1 - (4-N-carboxyethylpiperidyl)-3-(4-piperidyl)propane:

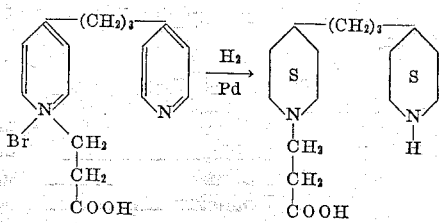

My N-carboxyalkylpiperidyl, piperidyl alkanes are amino carboxylic acids. They have the chemical properties associated with amino acids and are capable of entering into the same type of reactions as other amino acids within the limitations imposed by the piperidine nucleus.

My new amino acids when heated above their melting point react to form polyamides. These new polyamides are characterized by having recurring in their molecular make-up the grouping:

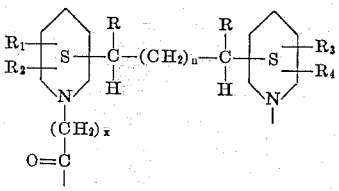

wherein R, $R_1$, $R_2$, $R_3$, $R_4$, $x$ and $n$ have the same designation as mentioned heretofore. The new polyamides are normally solid. They are insoluble in water and most of the common organic solvents. They may be formed into fibers, films, and molded articles.

My new amino acids may be esterified by reaction with alcohols. The resulting esters are useful in the manufacture of compositions having utility as corrosion inhibitors, such as for oil wells, oil refineries, in slushing oils, etc.

The manner of carrying out my invention is described in the following specific examples. These examples are given by way of illustration only and are not intended as a limitation of my invention.

EXAMPLE 1

1 - (4 - N - beta-carboxyethylpiperidyl)-3-(4-piperidyl)-propane

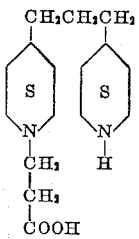

Procedure A

A mixture of 500 grams of 1,3-di-4-pyridylpropane, 1000 grams of water, 40 grams of sodium hydroxide, and 50 grams of 2-bromopropionic acid are placed into a three liter flask equipped with a stirrer and a reflux condenser. The mixture is stirred and heated under reflux conditions (about 105° C.) for from about four to six hours. During the heating a reaction occurs whereby sodium bromide and the sodium salt of 1-(4-N-beta-carboxyethylpiperidyl)-3-(4-piperidyl)propane are formed. After the refluxing period is over, the reaction mixture is cooled. The excess 1,3-di-4-pyridylpropane is separated from the reaction mixture by extraction with benzene. To the aqueous residue there is added just enough 1 N hydrochloric acid to liberate from its sodium salt the 1-(4-N-beta-carboxyethyl-piperidyl)-3-(4-piperidyl)propane. Then the mixture is evaporated to dryness, leaving behind a mixture of sodium chloride, sodium bromide, and the 1-(4-N-beta-carboxyethylpiperidyl)-3-(4-piperidyl)propane. The latter may be separated from the NaCl and NaBr by solvent extraction, as with isopropanol.

The 1 - (4 - N-beta-carboxyethylpiperidyl)-3-(4-piperidyl)propane is a white crystalline solid. It is soluble in dilute aqueous acids and also in dilute aqueous alkalies.

Procedure B

To a mixture of 132 grams of 1-(4-N-beta-cyanoethyl-piperidyl)-3-(4-piperidyl)propane and 700 grams of water in a two-liter flask, is added 100 grams of sodium hydroxide. The resulting mixture is heated under reflux conditions for about eight hours. During the reflux period ammonia is liberated, and the sodium salt of 1-(4-N-beta-carboxyethylpiperidyl)-3-(4-piperidyl)propane is formed. After the reflux period, the reaction mixture is cooled and the 1-(4-N-beta-carboxythylpiperidyl) - 3-(4-piperidyl)propane is isolated in any convenient way.

The 1-(4-N-cyanoethylpiperidyl) - 3-(4-piperidyl)propane used above is a new compound. It is the subject matter of a copending U.S. patent application. It is made by reacting acrylonitrile with a large excess of 1,3-di-4-piperidylpropane.

EXAMPLE 2

1-(4-N-carboxymethylpiperidyl)-5-(4-piperidyl)pentane

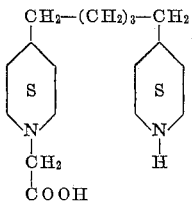

The procedure A of Example 1 is repeated with the exception that 600 grams of 1,5-di-(4-piperidyl)petane is used in place of the 500 grams of 1,3-di-4-piperidylpropane and 30 grams of mono-chloroacetic acid in place of the 50 grams of 2-bromo-propionic acid.

EXAMPLE 3

1-(2-N-beta-carboxyethylpiperidyl)-3-(2-piperidyl)propane

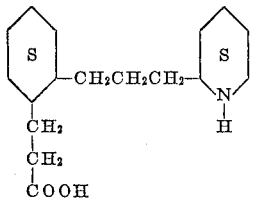

The procedure B of Example 1 is repeated with the exception that 1-(2-N-beta-cyanoethylpiperidyl)-3-(2-piperidyl)propane is used in place of the 1-(4-N-beta-cyanoethylpiperidyl)-3-(4-piperidyl)propane.

EXAMPLE 4

1-(4-N-beta-carboxyethylpiperidyl)-3-[2-(5-ethylpiperidyl)]propane

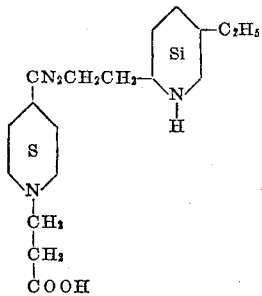

The procedure B of Example 1 is repeated with the exception that 1-(4-N-beta-cyanoethylpiperidyl)-3-[2-(5-ethylpiperidyl)]propane is used in place of the 1-(4-N-beta-cyanoethylpiperidyl)-3-(4-piperidyl)propane.

EXAMPLE 5

1-(3-N-beta-carboxyethylpiperidyl)-3-piperidyl)propane

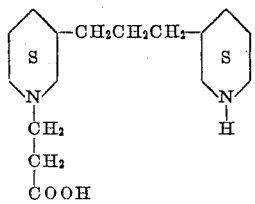

The procedure B of Example 1 is repeated with the exception that 1-(3-N-beta-cyanoethylpiperidyl)-3-(3-piperidyl)propane is used in place of the 1-(4-N-beta-cyanoethylpiperidyl)-3-(4-piperidyl)propane.

EXAMPLE 6

1-(4-N-delta-carboxybutylpiperidyl)-3-(4-piperidyl)propane

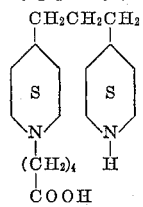

The rocedure A of Example 1 is used with the exception that 60 grams of 4-bromovaleric acid is used in place of the 50 grams of 2-bromo-propionic acid.

I claim as my invention:

1. An N-carboxyalkylpiperidyl, piperidyl alkane of the formula

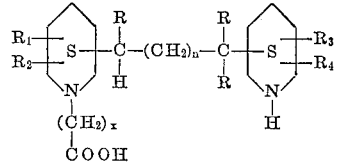

wherein R, $R_1$, $R_2$, $R_3$, and $R_4$ are selected from the class consisting of hydrogen and lower alkyl; $x$ is a small integer from 1 to 4; $n$ is a small integer from 0 to 4.

2. 1-(4-N-beta-carboxyethylpiperidyl)-3-(4-piperidyl)propane.

3. 1-(2-N-beta-carboxyethylpiperidyl)-3-(2-piperidyl)propane.

4. 1-(3-N-beta-carboxyethylpiperidyl)-3-(3-piperidyl)propane.

References Cited

UNITED STATES PATENTS

| | | | |
|---|---|---|---|
| 2,972,617 | 2/1961 | Cislak | 260—294.7 |
| 3,033,868 | 5/1962 | Hoffman et al. | 260—294 |
| 3,159,639 | 12/1964 | Freifelder | 260—294 |
| 3,277,101 | 10/1966 | Surrey | 260—294.7 |

JOHN D. RANDOLPH, *Primary Examiner.*

A. D. SPEVACK, *Assistant Examiner.*